H. D. Treadwell.
Fireman's Signal Guide.
No. 23,873. Patented May 3, 1859.

UNITED STATES PATENT OFFICE.

H. D. TREADWELL, OF ELMIRA, NEW YORK.

SIGNAL FOR FIREMEN.

Specification of Letters Patent No. 23,873, dated May 3, 1859.

*To all whom it may concern:*

Figure 1:
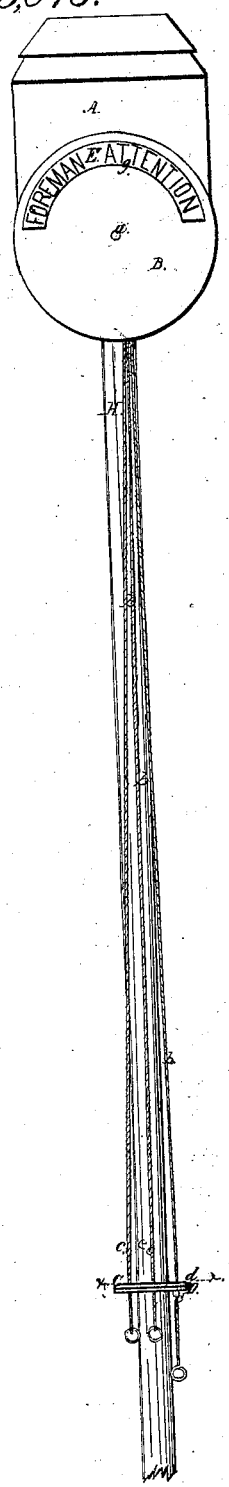
Figure 2:
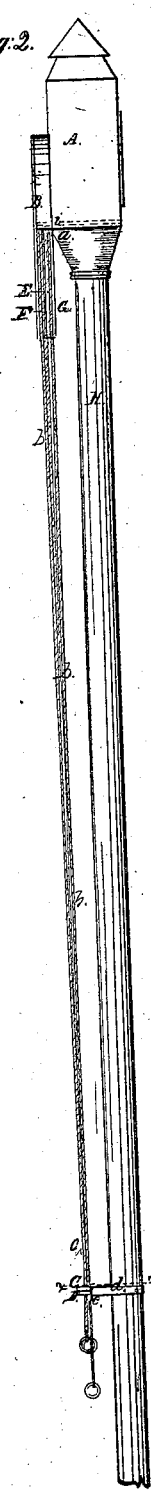
Figure 3:
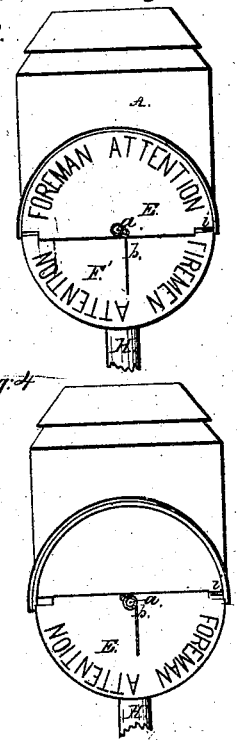
Figure 4:
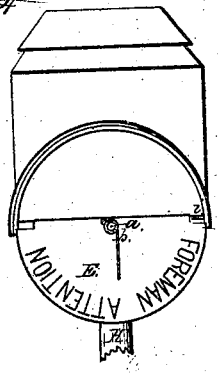
Figure 5:
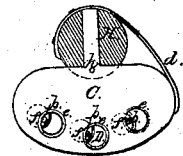
Figure 6:
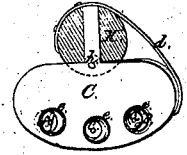

Be it known that I, H. D. TREADWELL, of Elmira, in the county of Chemung and State of New York, have invented a new and useful Improvement in Firemen's Signal-Guides; and I do hereby declare that the following is a full and exact description thereof, reference being had to the accompanying drawings, making part of this specification, Figure 1 being a front elevation of the instrument; Fig. 2, a side elevation thereof; Fig. 3, a view of the face thereof, the outside face-plate being removed in order to show the positions of the signal-plates when one of them is in use; Fig. 4, a similar view showing the positions of the signal-plates when neither is in use; Fig. 5, a horizontal section in the plane indicated by the line $x\,x$, Fig. 1; Fig. 6, a similar section in the same plane, showing the positions of the parts when in the act of shifting the signal-plates.

Like letters designate corresponding parts in all the figures.

A lantern A, is made of proper form and size, to receive a light for the purpose of illuminating the signal plates; and is mounted upon a staff H, of such length as to elevate it to the proper height above the ground. In front of the lantern, and at a sufficient distance therefrom to receive the desired number of signal plates, is secured a face-plate B, behind which the said signal plates are placed. The face-plate B, has a curved aperture $g$, in its upper half, concentric with its own center, and of sufficient length and width to exhibit the several signals through it. The signal plates E, F, G, form little more than a semi-circle, as represented in the drawings. They may be transparent, and be provided with opaque letters, or be opaque with interstitial letters, to compose the several signals. The signals are arranged in a curved line, so as to be seen through the aperture $g$, in the face-plate B. The said signal plates turn upon a pivot $a$, passing through the center of the face-plate, as represented in the drawings. To each of the signal plates E, F, G, near their centers, cords $b$, $b$, $b$, are respectively attached, and are thence passed around the pivot $a$, and extended downward, so as to be reached by the bearer of the instrument. This arrangement is such that, by drawing either of the cords downward, the signal plate, to which it is attached, will be turned half around, and thus be raised so as to exhibit its signal through the aperture in the face-plate. When the signal plates are not acted upon by the cords, they are pendent, as represented in Fig. 4, and concealed by the lower half of the face-plate B. When elevated, a spring $i$, under each signal plate, is pressed downward, and serves to start the said signal plates back sufficiently to enable them to return, by their own weight, to their concealed positions, as soon as set free by their cords. The springs $i$, may either be attached to the plates themselves, and press down upon a stop placed in the proper position, or be attached to a fixed part of the instrument and bear upward against the plates.

At a convenient distance from the foot of the staff H, to be reached by the hand of the bearer, a catch-plate C, is firmly fixed to the said staff, substantially as seen in Figs. 5 and 6. This plate contains a number of concentric holes $e$, $e$, $e$, equal to the number of signal plates above. Another plate D, is situated under or upon the fixed catch-plate, and is made to vibrate upon a pivot $h$, concentric therewith. It has concentric holes $f$, $f$, $f$, respectively corresponding, in number, size, and position, with those in the fixed catch-plate. A spring $d$, is fastened to the staff, and presses against the vibratory plate D, so as to cause its holes to shut by, and close, the holes in the plate C, except a sufficient space to receive one of the cords $b$, $b$, $b$, one of which passes downward through each pair of corresponding holes $e$ and $f$, in said plates, and so that a slight force will press the vibrating plate aside, and cause the holes of one plate to come opposite those of the other, and thus allow a free passage through both plates. On the cords $b$, $b$, $b$, are conical stops $c$, $c$, $c$, at such a distance above the catch plates that, when drawn down through the holes, and their tops bearing against the bottom of the plates, the signal plates to which the cords are attached will be raised so as to exhibit the signals thereon, through the aperture $g$, in the face-plate. The stops are of such shape that, when the lower points are inserted between the partially shut holes in the plates C, and D, they act as wedges to open the holes for their own passage. To facilitate the action of the stops in passing through the plates, the edges of the holes $e$, $e$, and $f$, $f$, may be rounded or flaring.

The tops of the stops are blunt or abrupt, so as to prevent their being drawn back through the holes when one plate is shut by the other. The several cords may be marked or labeled at the bottom, so as to indicate to the bearer what signal will be exhibited by drawing down any particular cord.

When it is desired to exhibit any signal, the bearer pulls the proper cord downward till its stop passes through the catch-plates, and thus retains the signal in sight. In passing through its pair of holes $e$ and $f$, the stop forces the vibratory plate D, against the spring $d$, sufficiently to bring the two holes opposite to each other. When a signal is to be changed, the cord of the desired signal plate, is simply drawn down in the manner just described; and the second stop, entering its proper holes $e$, and $f$, in the act of passing through the catch plates, releases the other cord, and allows that signal to disappear, as represented in Fig. 6.

What I claim as my invention is—

The combination of the catch-plates C, D, and conical stops $c$, $c$, $c$, or their equivalents, on the cords $b$, $b$, $b$, working through a series of holes in the catch plates, arranged substantially as set forth.

In witness that the above is a true specification of my improved signal guide for firemen, I hereunto affix my hand this 22d day of January, 1857.

H. D. TREADWELL.

Witnesses:
  J. S. BROWN,
  C. C. ATKINS, Jr.